(12) United States Patent  
Griggs

(10) Patent No.: US 7,784,803 B2
(45) Date of Patent: Aug. 31, 2010

(54) COMBINED FENDER AND BRAKE FOR SCOOTER

(75) Inventor: William Griggs, Anaheim, CA (US)

(73) Assignee: Razor USA, Inc., Cerritos, CA (US)

( * ) Notice: Subject to any disclaimer, the term of this patent is extended or adjusted under 35 U.S.C. 154(b) by 397 days.

(21) Appl. No.: 11/459,324

(22) Filed: Jul. 21, 2006

(65) Prior Publication Data

US 2008/0018071 A1  Jan. 24, 2008

(51) Int. Cl.
 *B62M 1/00* (2006.01)
(52) U.S. Cl. .............................. 280/87.041; 280/87.05; 280/264; 188/2 R
(58) Field of Classification Search ............ 280/87.041, 280/87.05, 47.315, 282, 264, 1.189; 180/221, 180/220, 181; 188/2 R, 24.12
 See application file for complete search history.

(56) References Cited

U.S. PATENT DOCUMENTS

| | | | | |
|---|---|---|---|---|
| 1,531,710 A * | 3/1925 | McLaren | ................. | 188/2 R |
| 1,581,168 A * | 4/1926 | Bullermann | ................. | 280/221 |
| 1,586,041 A * | 5/1926 | Kallajian | ................. | 188/2 R |
| 1,711,121 A * | 4/1929 | Nauts | ................. | 188/2 R |
| 1,977,035 A * | 10/1934 | Benjamin | ................. | 280/221 |
| 2,436,199 A * | 2/1948 | Holley | ................. | 280/255 |
| 2,617,658 A * | 11/1952 | James et al. | ................. | 280/1.189 |
| 3,870,330 A * | 3/1975 | Hatano et al. | ................. | 280/16 |
| 4,821,832 A * | 4/1989 | Patmont | ................. | 180/221 |
| 5,775,452 A * | 7/1998 | Patmont | ................. | 180/220 |
| 6,139,035 A | 10/2000 | Tsai | | |
| 6,213,561 B1 * | 4/2001 | Witthaus | ................. | 280/87.041 |
| 6,286,632 B1 | 9/2001 | Chai | | |
| 6,364,070 B1 | 4/2002 | Chen | | |
| 6,435,528 B1 | 8/2002 | Tsai | | |
| 6,485,039 B1 * | 11/2002 | Ming-Fu | ................. | 280/87.041 |
| 6,561,401 B1 * | 5/2003 | Tsai | ................. | 224/431 |
| 6,619,416 B2 * | 9/2003 | Lan | ................. | 180/181 |
| 7,040,443 B1 * | 5/2006 | Roth et al. | ................. | 180/221 |
| 2005/0230930 A1 | 10/2005 | Chung | | |

* cited by examiner

*Primary Examiner*—Hau V Phan
(74) *Attorney, Agent, or Firm*—Brunell IP, PC; Norman E. Brunell

(57) ABSTRACT

A scooter with a combination front fender and brake includes a frame, front and rear wheels mounted to the frame for rotation, a front fork assembly rotatable by a rider to steer the scooter, a pivot in the front fork assembly, a fender mounted for rotation on the pivot and a brake control lever assembly for causing the fender to rotate into contact with the front wheel to cause a braking action.

3 Claims, 4 Drawing Sheets

COMBINED FENDER AND BRAKE FOR SCOOTER

BACKGROUND OF THE INVENTION

1. Field of the Invention

This invention is related to brakes for two wheeled scooters and the like.

2. Description of the Prior Art

Various designs for scooter brakes are known but have disadvantages due to complexity, cost, location and ease of use.

What is needed is a design for scooter brakes without such limitations.

SUMMARY OF THE INVENTION

In a first aspect, a scooter includes a frame, front and rear wheels mounted to the frame for rotation, a front fork assembly rotatable by a rider to steer the scooter, a pivot in the front fork assembly, a fender mounted for rotation on the pivot and a brake control lever assembly for causing the fender to rotate into contact with the front wheel to cause a braking action.

In another aspect, a method of providing braking action in a scooter includes mounting a front fender for rotation about a pivot in a front fork and mounting a brake control lever for causing rotation of the front fender into contact with a front wheel to cause braking.

DETAILED DISCLOSURE OF THE PREFERRED EMBODIMENT(S)

Figure 1:
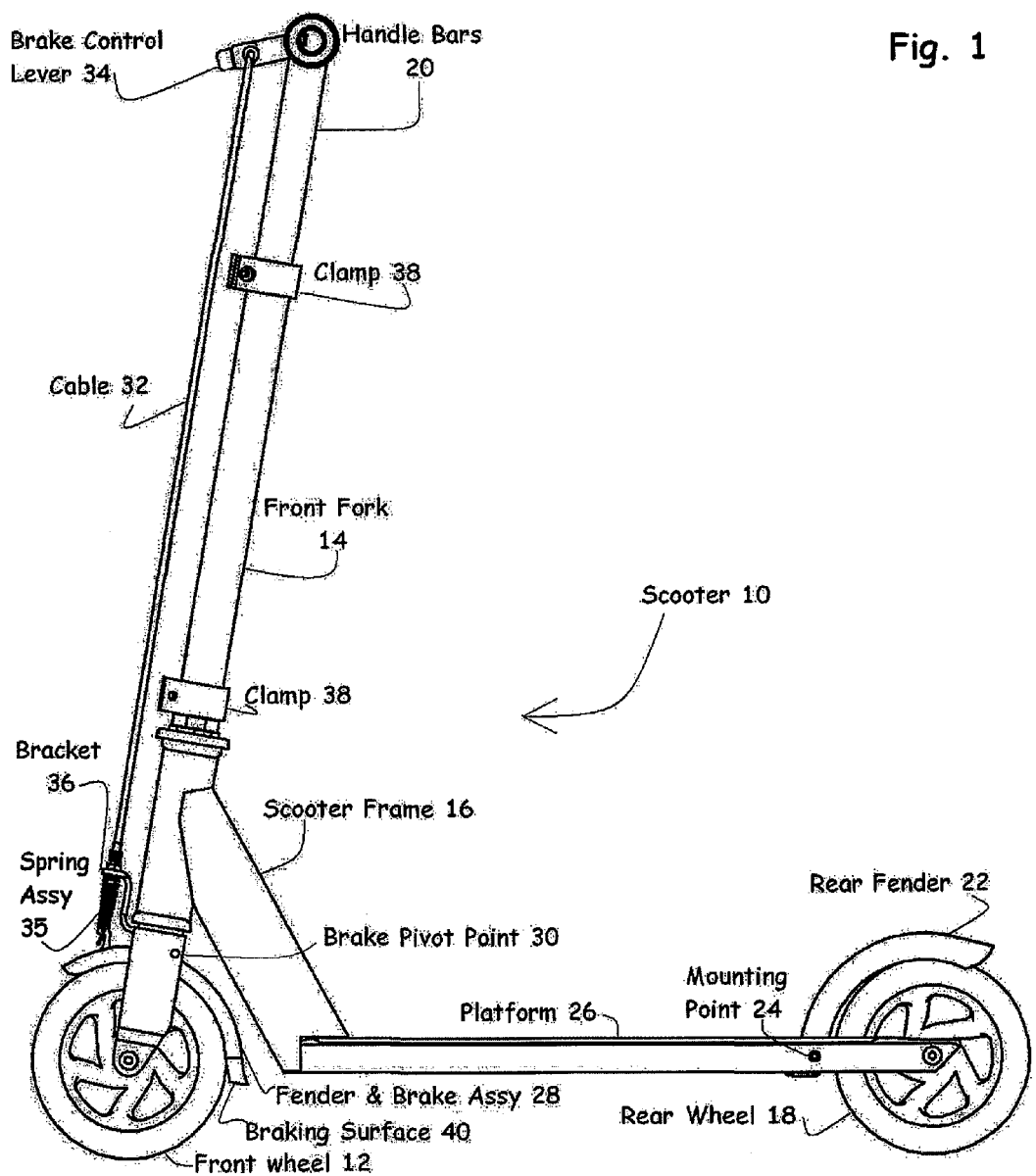
FIG. 1 is a side view of a two wheeled scooter having a combined front fender and brake.
Figure 2:
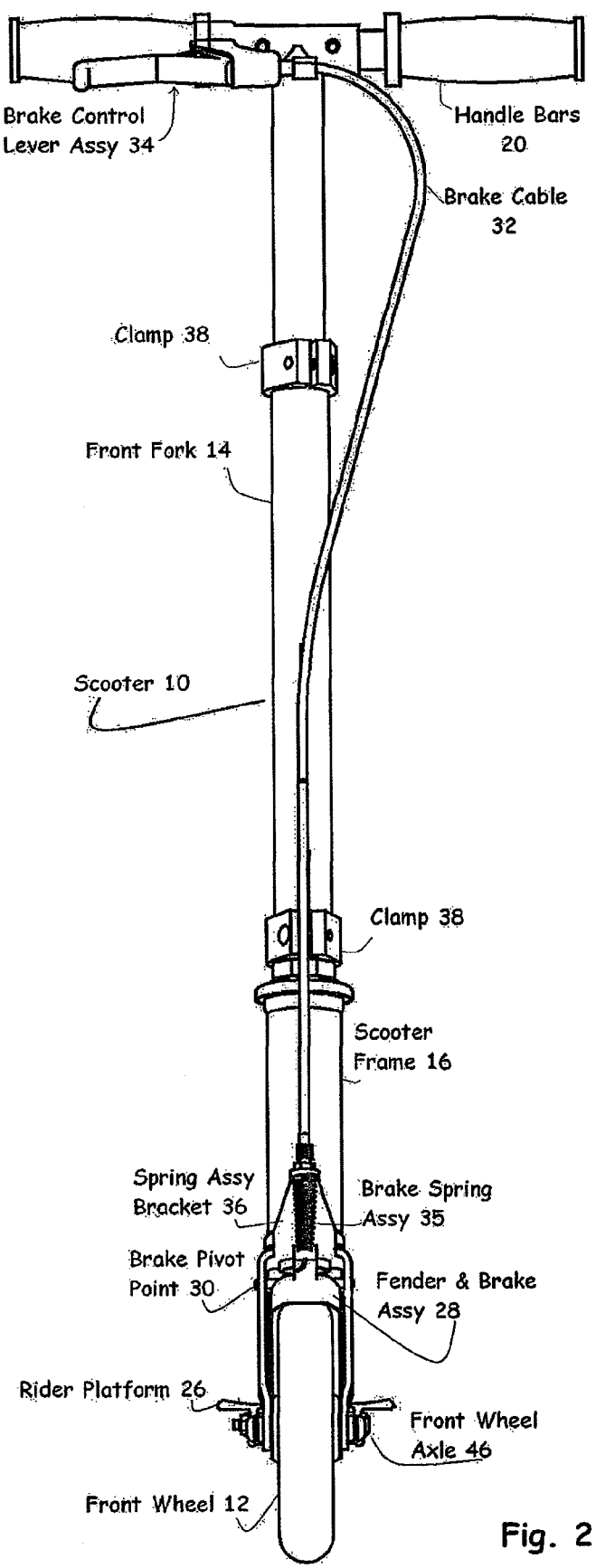
FIG. 2 is a front view of the scooter of FIG. 1.

Referring now to FIGS. 1 and 2, scooter 10 includes front wheel 12 mounted for rotation to front fork 14 which is in turn mounted for steering rotation to the front portion of scooter frame 16. Scooter 10 also includes rear wheel 18 mounted for rotation to a rearward portion of scooter frame 16. In alternate embodiments, scooter 10 may have more than two wheels, e.g. scooter 10 may have three or more wheels. Handle bars 20 are mounted to the top of front fork 14. Rear fender 22 is mounted to frame 16 at point 22 to generally surround the upper portion of rear wheel 18. Scooter frame 16 includes rider support platform 26.

Combined front fender and brake assembly 28 is mounted for rotation about brake pivot point 30 in the lower or wheel housing portion of front fork 14 or attached thereto. In a normal riding position, front fender and brake assembly 28 operates as a simple front fender proving clearance for rotation of the front wheel while preventing at least some of the dirt and other particles thrown by rotation of front wheel 12 from hitting scooter 10 and its rider. Brake control cable 32 is mounted between brake control lever 34 on handle bars 20 and the forward portion of fender and brake 28 extending forward of front fork 14. Brake spring assembly 35 is supported by spring assembly bracket 36 mounted to a portion of front fork 14 extending below scooter frame 16 so that spring assembly 34, and the lower end of brake control cable 32, rotates with front wheel 12.

Brake spring assembly 35 serves as a return spring to provide a force opposing the application of the brake lever to return the brake to a neutral position. In alternate embodiments, brake spring or return assembly 35 may be configured as a torsion spring mounted around or adjacent brake pivot point 30. Alternately, brake spring or return assembly 35 may be configured as a tension spring mounted between scooter frame 16 and a portion of fender and brake assembly 28 aft of brake pivot point 30.

Clamps 38 on front fork 14 are used to adjust the length of front fork 14 and may also be used to prevent and undo stress from being applied to brake cable 32. The length of cable 32 is preferably sufficient to permit front fork 14 to be adjusted to its full extension.

In operation, actuation of brake control lever 34 by a user causes interior cable in coaxial brake cable 32 to be put in tension and moved within the exterior cable housing generally towards control level 34, that is, upwards toward handle bars 20 and away from front wheel 12, against the resistance of the compression of brake spring assembly 35. The interior cable is affixed to the forward portion of fender and brake 28 which causes fender and brake 28 to rotate about pivot point 30. This rotation about pivot point 30 causes braking surface 40 of fender and brake assembly 28 to contact front wheel 12 and cause scooter 10 to slow down and/or stop.

Figure 3:
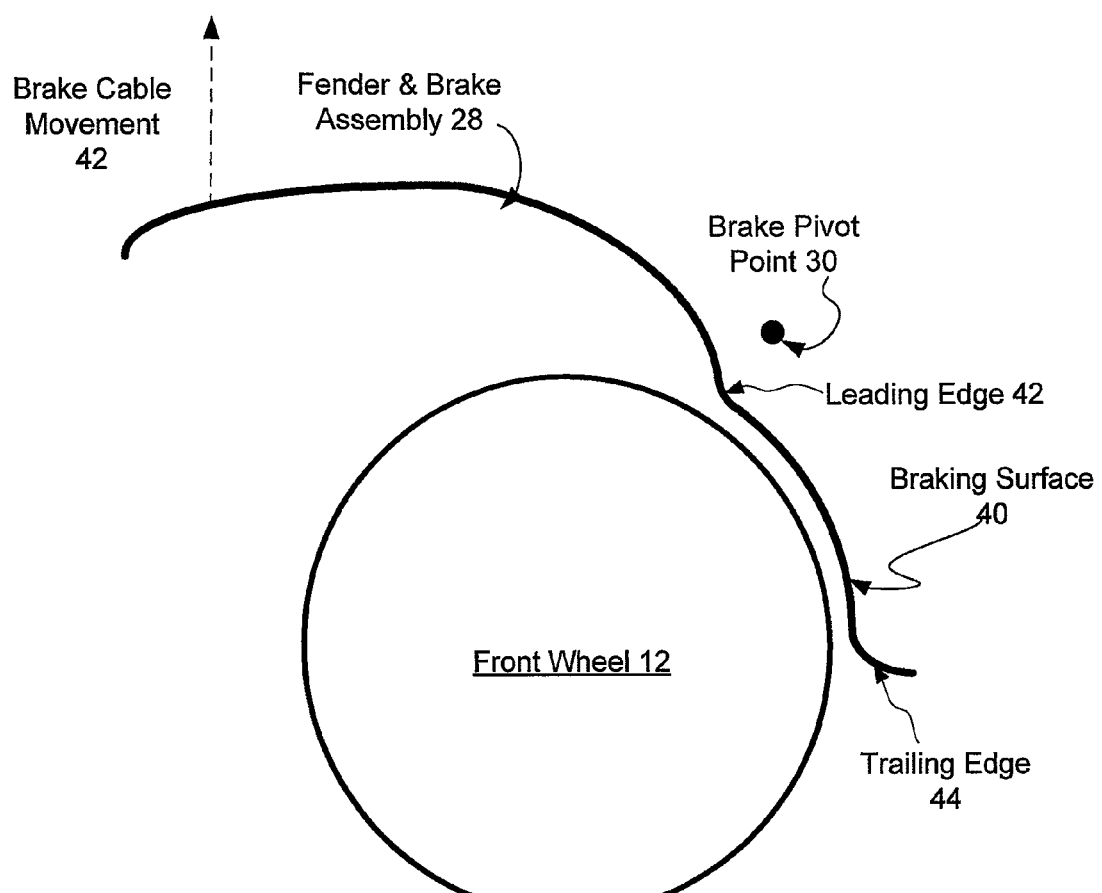
FIG. 3 is a cross sectional side view of the combined fender and brake illustrating the relationship between the arc of the brake shoe and the periphery of the front wheel of the scooter.

Referring now to FIG. 3, a side view of front wheel 12 is shown together with a center line arc of the interior of brake and fender assembly 28 after brake control lever 34 has been operated by a rider. Brake cable movement, shown by arrow 42, causes fender and brake assembly 28 to rotate about pivot point 30 so that braking surface 40 approaches and ultimately contacts the periphery of front wheel 12. This contact between braking surface 40 and wheel 12 causes the braking action.

As shown in an exaggerated form in the figure, in a preferred embodiment, it is preferable that braking surface 40 be curved or formed into an arc so that the maximum area of contact is achieved between braking surface 40 and wheel 12. It is preferable that leading edge 42 of braking surface 40 be curved slightly outward and away from contact with wheel 12 to avoid contact between leading edge 42 and wheel 12 during braking. Similarly, it is preferable that trailing edge 44 of braking surface 40 also curves or slants away from wheel 12 to similarly avoid contact with wheel 12 during braking. Leading and trailing edges 42 and 44 may be considered to be part of braking surface 40 or other portions of fender and braking assembly 28.

It is also preferable that braking surface 40 be resistant to the heat resulting from the friction caused by braking. Fender and brake assembly 28, and particularly braking surface 40 therein, can preferably be made of steel or aluminum and/or compound plastics having good thermal properties such as a thermoset plastic or Kevlar.

Figure 4:
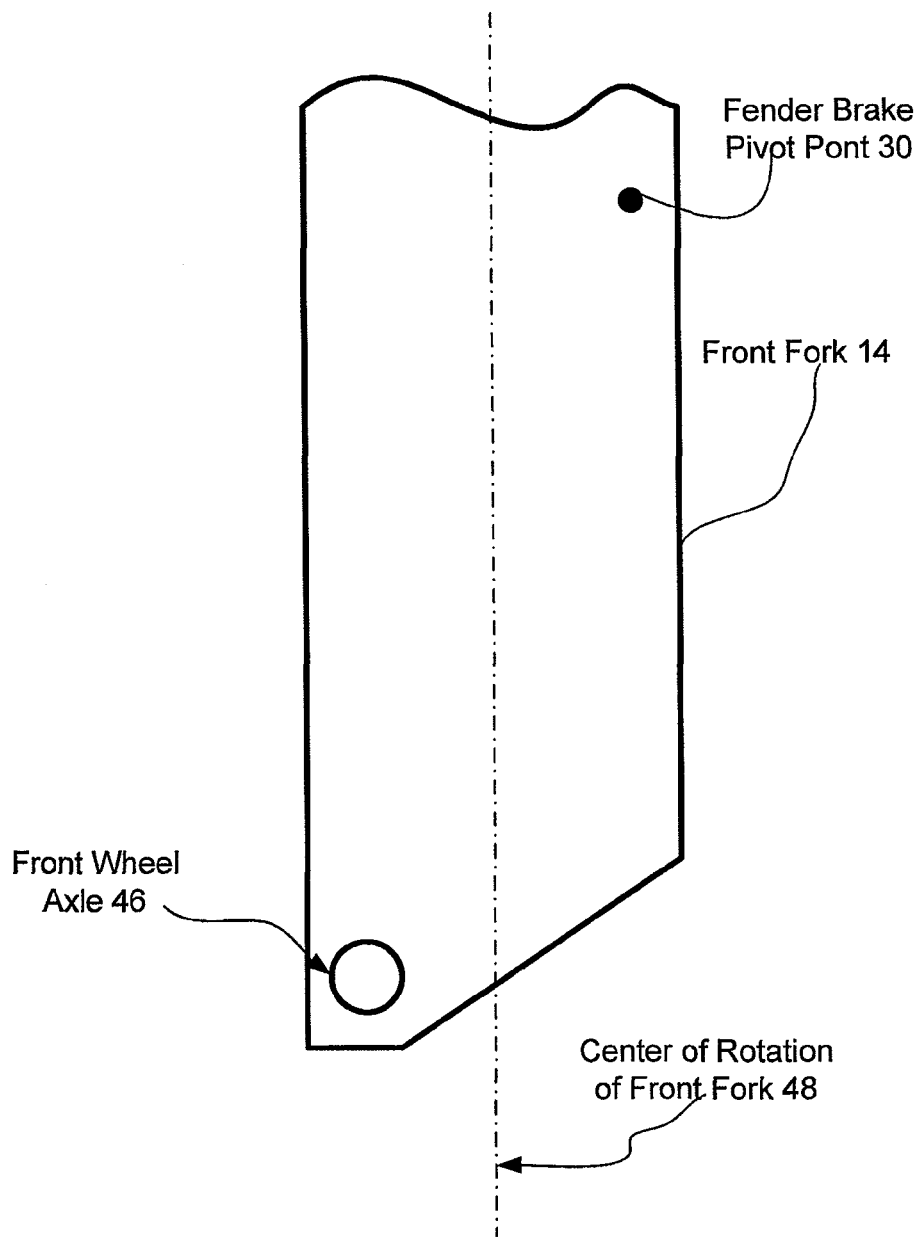
FIG. 4 is a schematic diagram of the positional relationship between the center of rotation of the front fork, the pivot for the fender brake assembly and the axle of rotation of the front wheel.

Referring now to FIG. 4, it is also preferable to mount fender and brake pivot point 30 in a trailing position, that is, aft of center of rotation 48 of front fork 14. Similarly, it is preferable to mount front wheel axle 46 in a leading position, that is, forward of center of rotation 48 of front fork 14.

The invention claimed is:

1. A scooter comprising:
   a frame for supporting a standing rider;
   at least one rear wheel mounted to a rear end of the frame for rotation;

a front fork assembly supporting a front end of the frame about a center of rotation of the front fork assembly, the front fork assembly having a front wheel and a handle bar mounted along the center of rotation and rotatable by a rider to steer the scooter;

a pivot in the front fork assembly mounted aft of the center of rotation;

a fender mounted for rotation on the pivot; and a brake control lever assembly for causing the fender to rotate into contact with the front wheel to cause a braking action, the brake control lever assembly including:

a flexible brake cable including an interior cable and an exterior housing mounted outside of the front fork assembly and rotatable therewith;

a brake lever operable by a user by compression against the handle bar for moving the interior cable with respect to the exterior cable; and a spring assembly mounted for rotation with the front fork assembly forward of the pivot for resisting the motion of the exterior cable.

2. The invention of claim 1 wherein the spring assembly further comprises:

a torsion spring mounted around the pivot for providing a return force resisting operation of the brake lever.

3. The invention of claim 1 wherein the spring assembly further comprises:

a bracket mounted between the fender and the front fork assembly for resisting motion of the exterior cable, and an expansion spring for providing a return force resisting operation of the brake lever.

* * * * *